US007215969B2

(12) United States Patent
Benco et al.

(10) Patent No.: US 7,215,969 B2
(45) Date of Patent: May 8, 2007

(54) METHOD FOR RF DEAD ZONE DATA COLLECTION USING MOBILE STATION

(75) Inventors: David S. Benco, Winfield, IL (US); Kevin J. Overend, Elmhurst, IL (US); Baoling S. Sheen, Naperville, IL (US); Sandra L. True, St. Charles, IL (US); Kenneth J. Voight, Sugar Grove, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 374 days.

(21) Appl. No.: 10/623,627

(22) Filed: Jul. 21, 2003

(65) Prior Publication Data

US 2005/0020284 A1 Jan. 27, 2005

(51) Int. Cl.
*H04Q 7/20* (2006.01)
(52) U.S. Cl. .............................. 455/456.6; 455/456.2; 455/456.3; 455/67.11
(58) Field of Classification Search ............. 455/67.11, 455/423, 446, 456.1, 436; 375/225
See application file for complete search history.

(56) References Cited

U.S. PATENT DOCUMENTS

| 6,097,954 | A | 8/2000 | Kumar et al. |
| 6,119,005 | A | 9/2000 | Smolik |
| 6,298,233 | B1 * | 10/2001 | Souissi et al. .............. 455/423 |
| 6,459,695 | B1 | 10/2002 | Schmitt |
| 6,522,888 | B1 | 2/2003 | Garceran et al. |
| 6,539,230 | B2 | 3/2003 | Yen |
| 6,597,906 | B1 * | 7/2003 | Van Leeuwen et al. ..... 455/436 |
| 6,714,789 | B1 * | 3/2004 | Oh et al. .................. 455/456.1 |
| 6,751,443 | B2 * | 6/2004 | Haymes et al. .......... 455/67.11 |
| 2002/0193104 | A1 * | 12/2002 | Scherzer et al. ............ 455/423 |

* cited by examiner

*Primary Examiner*—Joseph Feild
*Assistant Examiner*—Phuoc Doan

(57) ABSTRACT

A method for collecting data to identify an RF dead zone in a cell of a wireless network using a mobile station is provided. The method includes: a) receiving position data from the mobile station at a base station when the mobile station is powered up and located within the cell, b) communicating the position data from the base station to a mobile switching center, and c) storing the position data in an RF dead zone network. In another embodiment, a method for collecting data to identify an RF dead zone in a wireless network using a mobile station is provided. The wireless network provides wireless service to a plurality of cells and includes a plurality of base stations corresponding to the cells. In still another embodiment, a method for collecting data to identify an RF dead zone in a wireless network using a plurality of mobile stations is provided.

22 Claims, 4 Drawing Sheets

METHOD FOR RF DEAD ZONE DATA COLLECTION USING MOBILE STATION

BACKGROUND OF INVENTION

The invention generally relates to a method for radio frequency (RF) dead zone data collection in a wireless network and, more particularly, to a method for RF dead zone data collection using one or more mobile stations (MSs) and will be described with particular reference thereto. However, it is to be appreciated that the invention is also amenable to other applications.

In general, wireless service providers seek to maximize usage of their wireless networks, provide uninterrupted wireless service for subscribers, and keep the cost of providing these wireless services to a minimum. There are often tradeoffs involved between the first two goals and the third. One aspect of wireless communications where the tension between these goals may be seen is in RF coverage trouble spots (e.g., RF dead zones) within cells in the wireless network. For example, one of the causes of lost revenues for the wireless service provider is dropped calls due to RF dead zones.

The geographic region served by a wireless network is divided into a plurality of areas known as "cells". Typically, each cell includes a base station (BS) that provides an RF interface to MSs in the cell. When the geographic region is first divided into cells, the cells are engineered to provide coverage for the anticipated MS usage. Further, the cell is engineered to take into account topological aspects of its sub-region, such as tall buildings, highway traffic and geological formations such as mountains.

Only when the wireless network is placed into service is the accuracy of the engineering assumptions tested. There may be dead zones that were unanticipated or that develop due to changes in season or new constructions. The wireless service provider may receive complaints regarding dropped calls or no responses from the wireless system. Subscriber complaints may be evaluated by wireless service providers to identify RF dead zones and evaluate the impact of the dead zone on revenue. However, this is not reliable for evaluating the impact on revenue because often a subscriber experiencing a dropped call does not call the wireless service provider's customer service office to complain. Typically, it is more important for the subscriber to call the dropped party back. Later, it is inconvenient and much less important to call customer service with a complaint about the RF dead zone.

Nevertheless, in response to complaints, the wireless service provider then may send out specially equipped trucks to determine the location and extent of the problems. In some cases, the wireless service provider adds repeaters or supplemental "micro" or "pico" cells to provide RF coverage in the dead zones. In many cases, however, additional micro cells to improve RF coverage are frequently over engineered and one (or more) of the micro cells end up lightly loaded. The wireless service provider has thus unnecessarily increased cost while providing modestly improved wireless service.

In addition to responding to complaints, wireless service providers may perform RF drive testing in order to identify these "dead zones" in their service areas. This type of drive testing is an expensive operating cost to the wireless service provider and often needs to be repeated with the change of seasons, when some buildings and structures are constructed, and when other environmental changes causing new or altered dead zones occur. Moreover, many RF dead zones identified through drive testing have little or no impact on revenue to the wireless service provider. The point being that RF drive testing has no way of prioritizing or evaluating the impact of an RF dead zone on revenue.

One approach to solving this problem is disclosed in U.S. Pat. No. 6,459,695 to Schmitt and assigned to Lucent Technologies. The '695 patent discloses a method that rapidly and precisely determines the geographical location of areas of high concentration of usage (hot spots) and areas of poor RF frequency reception (dead spots) by measuring the number of failed call attempts, dropped calls and the like. The method also compares these areas. The identification of an MS and its location are recorded at selected points during a call. If a high number of uncompleted calls or dropped calls are recorded, then the BS can use the last known location of the MSs involved to circumscribe an area in which the hot spot or dead spot occurs. Notably, Schmitt collects location information from MSs during connected calls and stores the location information for any connected call that is subsequently dropped. The stored location information may then be used to identify, for example, RF dead zones.

A similar problem and solution associated with optimizing RF coverage in a wireless network is disclosed in U.S. Pat. No. 6,522,888 to Garceran et al. and assigned to Lucent Technologies. The '888 patent discloses a system for determining coverage in a wireless network that uses location information for an MS and collects information on communications between the MS and the wireless network in association with the location information. The wireless network determines and/or receives location information for the MS along with other information associated with the location information. The information by location can be used to represent the coverage of a geographic region. For example, during communications between a serving BS and an MS, the serving BS could receive and/or determine signal quality measurements of a forward link and/or of a reverse link at a particular location. Additionally, neighboring BSs can monitor the communications and determine and/or receive location information for the location of the MS along with the information associated with or corresponding to the location of the MS. The associated information can be linked with additional parameters, such as MS type, MS identity, frequency, operating conditions and/or BS identity. Notably, Garceran collects location information and various other parameters from MSs and produces an RF coverage map. Depending upon the position of an MS within the RF coverage map, RF transmissions from the MS are adjusted to improve RF coverage. The location information is not used to identify RF dead zones.

Thus, there is motivation for an improved method for collection of data to identify RF dead zones in a wireless network using mobile stations operated by subscribers associated with the wireless network. Moreover, there is a particular motivation to extend the use of data associated with RF dead zones to subsequent reduction or elimination of one or more areas identified as dead zones.

BRIEF SUMMARY OF INVENTION

In one aspect of the invention, a method for collecting data to identify an RF dead zone in a cell of a wireless network using a mobile station is provided. The method includes: a) receiving position data from the mobile station at a base station associated with the cell when the mobile station is powered up and located within the cell, wherein the position data includes multiple coordinates indicating a location of the mobile station within the cell, b) communicating the position data from the base station to a mobile switching center associated with the base station and the wireless network, and c) storing the position data in an RF dead zone network associated with the wireless network.

In another aspect of the invention, a method for collecting data to identify an RF dead zone in a wireless network using a mobile station is provided. The wireless network provides wireless service to a geographic area comprised of a plurality of cells and includes a plurality of base stations corresponding to the plurality of cells. The method includes: a) receiving position data from the mobile station with at least one base station of the plurality of base stations when the mobile station is powered up and located within the geographic area associated with the wireless network, wherein the position data includes multiple coordinates indicating a location of the mobile station within the wireless network, b) communicating the position data from the at least one base station to a mobile switching center associated with the at least one base station and the wireless network, and c) storing the position data in an RF dead zone database associated with the wireless network.

In still another aspect of the invention, a method for collecting data to identify an RF dead zone in a wireless network using a plurality of mobile stations is provided. The wireless network provides wireless service to a geographic area comprised of a plurality of cells and includes a plurality of base stations corresponding to the plurality of cells. The method includes: i) at each powered-up mobile station: a) receiving a pilot strength measurement message from the base station, b) determining that the received pilot strength measurement message is less than a predetermined threshold, c) receiving information from at least three RF transmitting devices, d) determining the multiple coordinates forming the position data from the received information, and e) transmitting the position data to the at least one base station; ii) at one or more base stations: f) receiving position data from each powered-up mobile station whether or not any of the powered-up mobile station is connected to an incoming or outgoing call, the one or more base stations corresponding to one or more cells in which any of the powered-up mobile stations are located, wherein the position data from each powered-up mobile station includes multiple coordinates indicating a location of the powered-up mobile station within the wireless network and g) communicating the position data to one or more mobile switching centers associated with the one or more base stations and the wireless network; and iii) at one or more mobile switching centers: h) storing the position data received from the one or more base stations in an RF dead zone database associated with the wireless network.

Benefits and advantages of the invention will become apparent to those of ordinary skill in the art upon reading and understanding the description of the invention provided herein.

BRIEF DESCRIPTION OF DRAWINGS

The invention is described in more detail in conjunction with a set of accompanying drawings.

DETAILED DESCRIPTION

Figure 1:
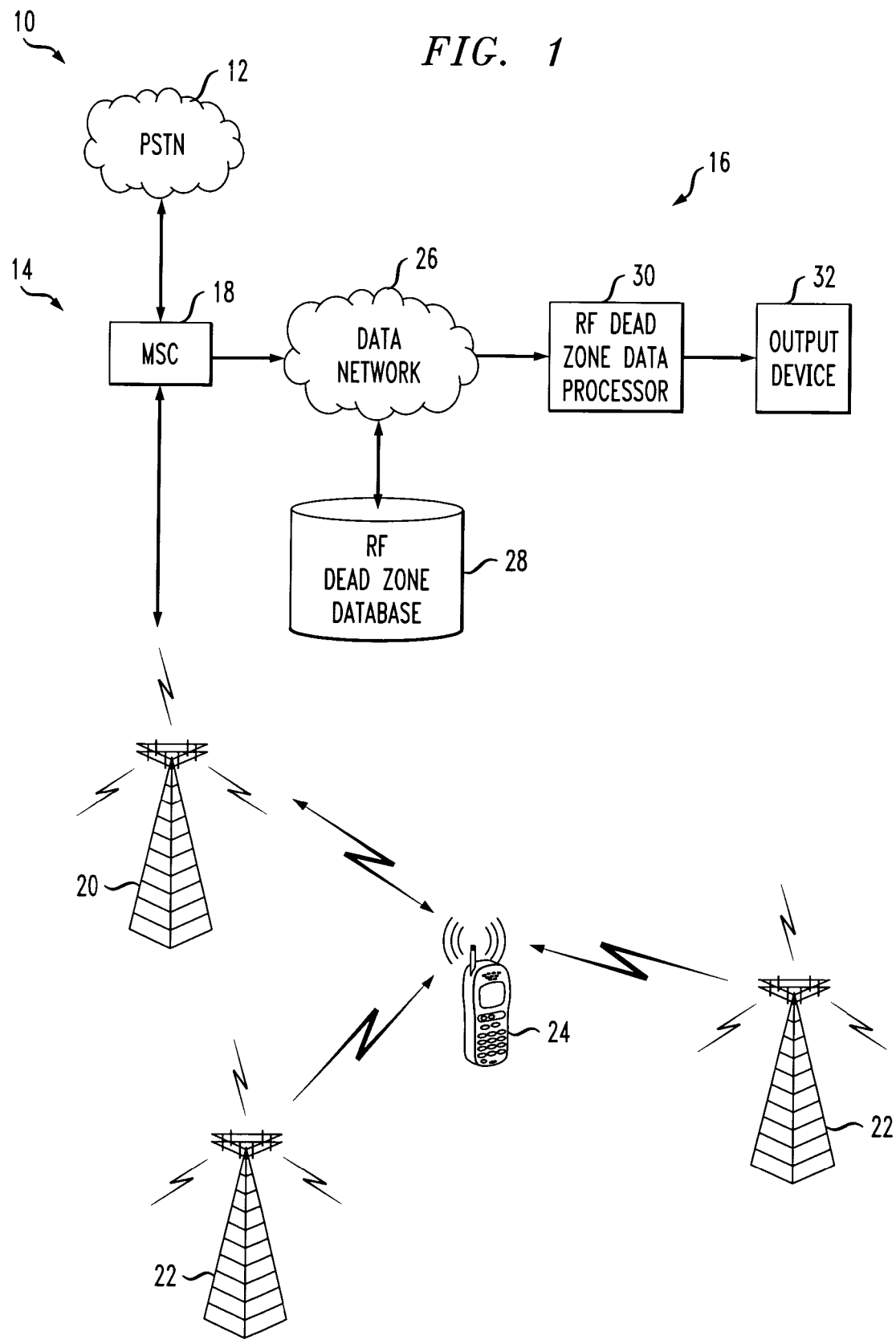
FIG. 1 is a block diagram of an embodiment of a telecommunication system incorporating the invention.

While the invention is described in conjunction with the accompanying drawings, the drawings are merely for purposes of illustrating exemplary embodiments of the invention and are not to be construed as limiting the invention to such embodiments. It is understood that the invention may take form in various components and arrangement of components and in various steps and arrangement of steps beyond those provided in the drawings and associated description. In the drawings, like reference numerals denote like elements and similar reference numerals denote similar elements.

With reference to FIG. 1, an embodiment of a telecommunication system 10 incorporating the invention includes a public switched telephone network (PSTN) 12, a wireless network 14, and a radio frequency (RF) dead zone data network 16. The wireless network 14 includes a mobile switching center (MSC) 18, a first or serving base station (BS) 20, second and third BSs 22, and a mobile station (MS) 24. The RF dead zone network 16 includes a data network 26, an RF dead zone database 28, an RF dead zone data processor 30, and an output device 32.

The wireless network 14 is in communication with the PSTN 12 and the RF dead zone network 16. The PSTN 12 provides the wireless network 14 with communication access to subscribers and users of a variety of telecommunication devices. The RF dead zone network 16 provides the wireless network 14 with a means for storing RF dead zone data collected from the MS 24. A wireless service provider associated with the wireless network 14 can use the RF dead zone network 16 to obtain RF dead zone data reports identifying one or more RF dead zones in the wireless network 14. Moreover, as desired, the RF dead zone reports can be used by the wireless service provider as a basis for RF engineering and design efforts undertaken to improve RF coverage in the one or more RF dead zones of the wireless network 14.

As shown, the wireless network 14 includes the MS 24, the first or serving BS 20, the second and third BSs 22, and the MSC 18. The MS 24 is currently within a cell of the wireless network that is served by the serving BS 20. The second and third BSs 22 are associated with other cells that are adjacent or otherwise nearby the cell within which the MS 18 is currently located. The MS 24 is in bi-directional wireless communication with the serving BS 20. The MS 24 also receives wireless communications from the second and third BSs 22. Again, as shown, the serving BS 20 is in communication with the MSC 18 and the MSC 18 is in communication with the RF dead zone network 16.

In practice, the wireless network 14 generally includes a plurality of interconnected MSCs. Each MSC is in communication with a plurality of BSs and the RF dead zone network 16. As such, the second and third BSs 22 may communicate with the MSC 18. Otherwise, the second and third BSs 22 may communicate with another MSC (not shown). Moreover, the first, second, and third BSs (20, 22, 22) are representative of any three adjacent BSs in the wireless network 14. Depending on the configuration of the wireless network and the specific location of the MS 24, the MS 24 may receive control signals from more or less than three BSs. For example, from time to time the MS may receive control signals from one BS (e.g., serving BS) to at least four BSs (e.g., serving, second, third, and additional BSs). Additionally, when the MS 24 is located in an RF dead zone it is understood that the MS cannot communicate with any BS in the wireless network 14.

Moreover, as the MS 24 travels from the initial cell served by the first BS 20 to an adjacent cell within the wireless network 14, the first BS 20 hands off the serving function to the BS responsible for serving the adjacent cell. Such hand-offs continue, in like fashion, as the MS 24 travels from cell to cell within the wireless network 24. Hence, depending on the location of the MS 24, any BS and MSC associated with the wireless network can serve the MS 24. Further, the wireless network 14 can serve a plurality of MSs. Each MS can be located in any cell of the wireless network. Various types of MSs can be served, including MSs that do not contribute to collection of RF dead zone data.

The RF dead zone network 16 may be implemented, for example, by any arrangement of one or more computer networks or by a computer system. The data network 26 receives communications from the wireless network 14 and is in communication with the RF dead zone database 28 and the RF dead zone data processor 30. The data network 26 may utilize any suitable type of topology and communication protocol. The RF dead zone database 28 includes one or more storage devices. For example, one or more hard disk drives, one or more file servers, etc. The RF dead zone data processor 30 includes any suitable type of processor and typically includes an input device (e.g., keyboard, pointing device, etc.) and a storage device (e.g., memory, disk drive, etc.). The RF dead zone data processor 30 is in communication with the output device 32. The output device 32 may include a display, a printer, and/or any other type of suitable rendering device capable of rendering text and/or graphics reports containing RF dead zone data.

In general, the MS 24 includes a position determining process that receives information from at least three BSs (e.g., first, second, and third BSs (20, 22, 22). The information from each BS may include geographic position information (e.g., latitude, longitude, altitude) associated with the location of the BS. Alternatively, the information from the BSs may include location information in any suitable form or a BS identifier. If the information is merely a BS identifier, the MS may include a look up table (LUT) that stores geographic position information for BSs. Typically, the LUT is indexed by BS identifier. The position determining process produces position data from the information received using a triangulation process (also known as trilateration process). The position data corresponds to the location of the MS 24 when the information was received. Typically, either the information received from the BSs includes a synchronized time of day reference or the MS 24 includes a timer for time stamping when information is received from a given BS. If information was received from at least three BSs, the position data includes X,Y coordinates (e.g., latitude and longitude) that correspond to a surface point within the wireless network 14. If information was received from at least four BSs, the position data may also include a Z coordinate (e.g., altitude). The X,Y,Z position data corresponding to a three-dimensional point within the wireless network 14. The MS 24 communicates the position data to the serving BS 20. The serving BS 20 communicates the position data to the MSC 18. The MSC 18 stores the position data in the RF dead zone database 28 via the data network 26. This process is periodically repeated over time with the RF dead zone database 28 storing and accumulating the position data collected by the MS 24. Additional details associated with collection of the position data are provided below in conjunction with the description of FIG. 3.

The RF dead zone data processor 30 responds to requests for RF dead zone data reports from the wireless service provider by retrieving position data from the RF dead zone database 28. The position data is processed into an RF dead zone report according to parameters specified in the request and provided to the output device 32. Additional details associated with utilizing the position data are provided below in conjunction with the description of FIG. 4.

Figure 2:
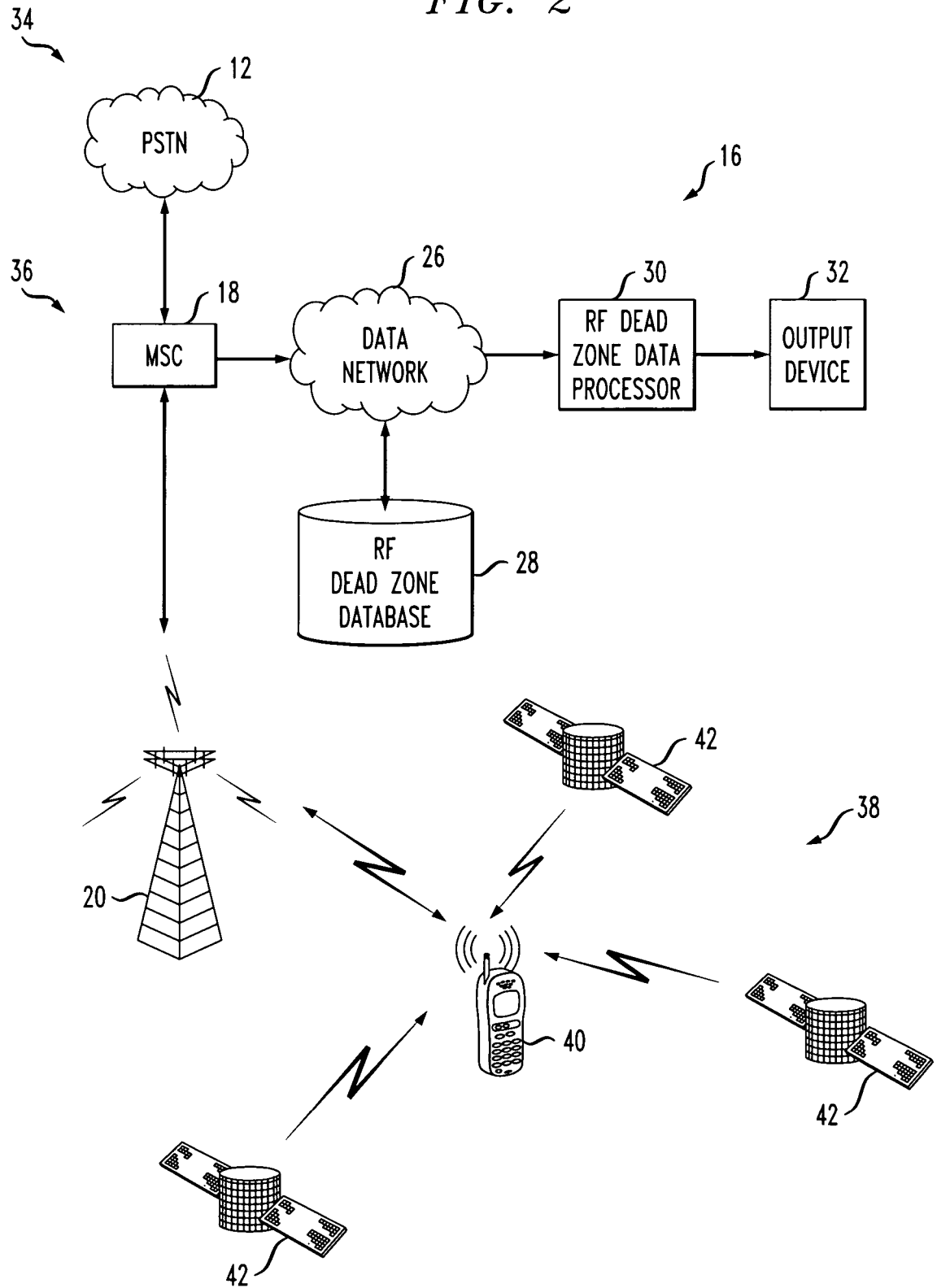
FIG. 2 is a block diagram of another embodiment of a telecommunication system incorporating the invention.

With reference to FIG. 2, another embodiment of a telecommunication system 34 incorporating the invention includes the PSTN 12, the RF dead zone network 16, another embodiment of a wireless network 36, and a global positioning system (GPS) satellite constellation 38. The PSTN 12 and RF dead zone network 16 operate as described above in reference to FIG. 1.

In the embodiment being described, the wireless network 36 includes the MSC 18, the first or serving BS 20, and an MS 40. The MSC 18 and serving BS 20 operate as described above in reference to FIG. 1. The MS 40 operates as described above in reference to the MS of FIG. 1, except that the position determining process receives information from the GPS satellites 42 and functions much like a GPS receiver.

As shown, the GPS satellite constellation 38 includes three GPS satellites 42 orbiting the Earth. In practice, the GPS satellite constellation 38 is preferably a public GPS satellite constellation including a plurality of GPS satellites. Each GPS satellite includes a clock and has an understanding of its own orbit with respect to the center of the Earth. Each GPS satellite continually broadcasts its position with respect to the center of the Earth and time with respect to a time of day reference.

GPS satellites are well known for enabling a device with a GPS receiver (e.g., MS 40) to locate its location on or near the Earth. For example, such devices are commonly used for navigation in many different applications, such as aviation, nautical travel, automobile travel, etc. Preferably, the GPS satellite constellation 38 includes enough GPS satellites and the satellites are spaced apart so that from any point within the wireless network 36, at least three GPS satellites 42 will be above the horizon.

The MS 40, through the position determining process (e.g., GPS receiver), can determine its location in longitude and latitude from position and time data from at least three GPS satellites 42. If position and time data is received from at least four GPS satellites, the MS 40 can determine its location in longitude, latitude, and altitude.

One public GPS satellite constellation is the NAVSTAR GPS satellite constellation developed by the U.S. Department of Defense. The NAVSTAR GPS satellite constellation includes 27 GPS satellites (24 operational, 3 spare) orbiting at about 12,000 miles (19,300 km). The GPS satellites are dispersed around six planes with at least four GPS satellites in each plane. The orbits are arranged so that at any time anywhere on Earth, there are at least four GPS satellites above the horizon. Preferably, the GPS satellite constellation 38 is the NAVSTAR GPS satellite constellation. The telecommunication system 10 works just as well with any other public GPS satellite constellation, such as the GLONASS satellite constellation maintained by the Russian Federation or the Galileo satellite constellation introduced by European countries. The GPS satellite constellation 38 could also be a private satellite system.

Figure 3:
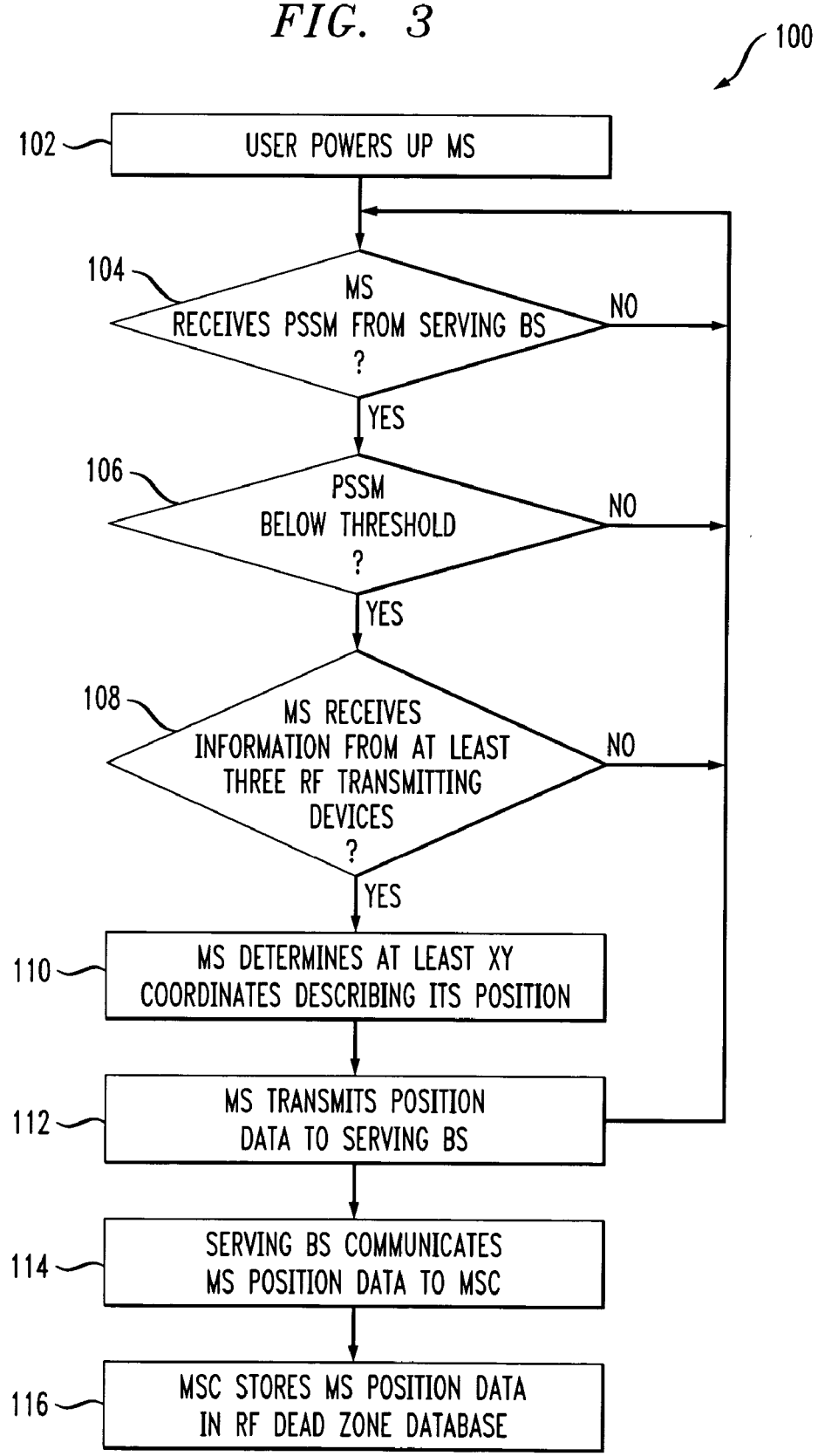
FIG. 3 is a flow chart of an embodiment of a method for collecting data to identify RF dead zones in a wireless network.

With reference to FIG. 3, a method 100 for collecting data to identify RF dead zones in a wireless network begins at step 102 when a user powers up an MS associated with the wireless network. Next, at step 104, the MS determines whether a pilot strength measurement message (PSMM) has been received from a BS associated with the wireless network. The PSMM is known for its use in handing off an MS from a serving BS to another BS in an adjacent cell of the wireless network. Alternatively, another type of message or control signal that is indicative of whether or not the MS and BS are currently able to properly support communications associated with an incoming or outgoing call. If a PSMM was received, the MS determines whether the signal strength of the PSMM is below a predetermined threshold (step 106). Typically, the predetermined threshold is selected based on a detectable signal strength that may potentially border on an RF dead zone associated with the wireless network. If the PSMM is below the predetermined threshold, in step 108 the MS determines whether information has been received from at least three RF transmitting devices. In one embodiment, the RF transmitting devices are BSs as depicted in FIG. 1. In another embodiment, the RF transmitting devices are GPS satellites as depicted in FIG. 2.

If information was received from at least three RF transmitting devices, at step 110 the MS determines at least X,Y coordinates describing its location within the wireless network when the information was received. The X,Y coordinates may be more generally referred to as position data and may be presented in terms of latitude and longitude. Next, at step 112, the MS transmits the position data to a BS associated with the wireless network. The BS is currently serving the MS due to the current location of the MS.

Next, the process repeats steps 104 through 112 while also continuing to step 114 where the serving BS communicates the MS position data to an MSC associated with the serving BS. Hence, the MSC is also serving the MS based on its current location in the wireless network. Next, at step 116, the MSC stores the MS position data in an RF dead zone database associated with an RF dead zone network. Note that steps 114 and 116 are also repeated for each cycle of steps 104–112 as long as the MS is powered up whether or not the MS is connected to an incoming or outgoing call.

At step 104, if a PSMM was not received, the process returns to step 104 until a PSMM is received. Typically, when a PSMM is not received the MS is either out of range of the wireless network or in an RF dead zone within the wireless network.

At step 106, if the PSMM is not below the predetermined threshold, the process returns to step 104. Typically, when the PSSM is not below the predetermined threshold the MS is not approaching an RF dead zone. Hence, it is not necessary to store position data associated with the current location of the MS.

At step 108, if the MS did not receive information from at least three RF transmitting devices, the process returns to step 104. If the MS did not receive information from at least three RF transmitting devices, the MS does not have enough information to determine its current location. The predetermined threshold in step 106 is preferably selected so that position data for previous locations of the MS are collected when the MS does receive information from at least three RF transmitting devices.

The method 100 may be performed in parallel for multiple MSs. As position data is accumulated over time, the position data stored tends to represents borders surrounding RF dead zones within the wireless network due to the threshold used in step 106.

In another embodiment, the method may exclude steps 104 and 106. This results in collection of additional position data that tends to fill in the overall RF coverage area. Areas having sparse or no position data are potential RF dead zones.

Figure 4:
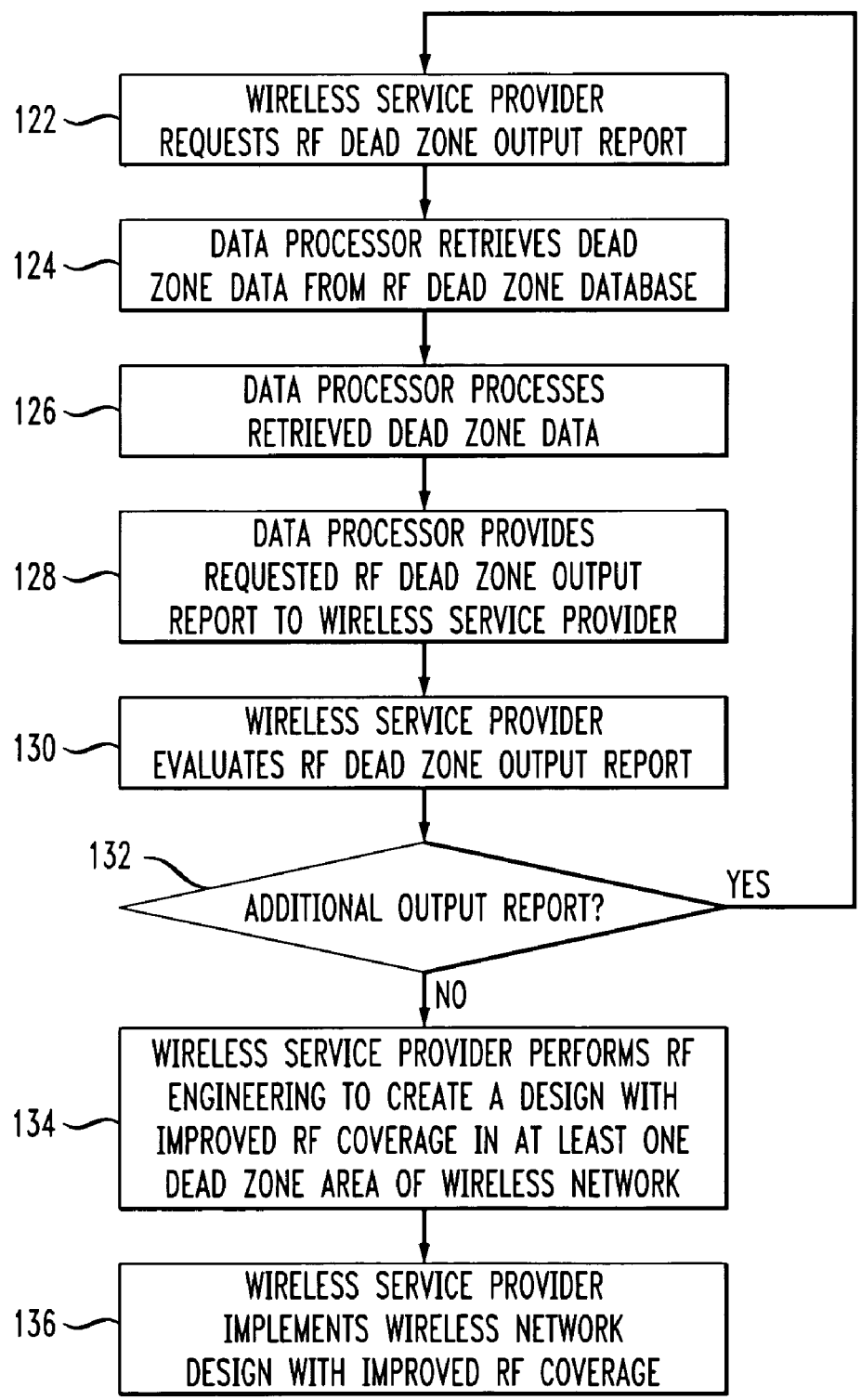
FIG. 4 is a flow chart of an embodiment of a method for utilizing the data collected in FIG. 3 to improve RF coverage in RF dead zones in a wireless network.

With reference to FIG. 4, a method 120 for utilizing the data collected in FIG. 3 begins at step 122 when a wireless service provider using the RF dead zone network requests an RF dead zone output report. As such, the method 120 may be viewed as an extension of the method 100 described above in reference to FIG. 3. The report request may include various attributes including a range of calendar dates and/or range of time of day for position data to include in the report. Additionally, certain geographic areas (e.g., cells and/or cell sectors) of the wireless network can be specified. Any other attribute or characteristic that is suitable for evaluating RF dead zones within the wireless network may also be provided as a parameter for limiting the scope of the output reports.

After step 122, an RF dead zone data processor retrieves the position data (i.e., RF dead zone data) from the RF dead zone database (step 124). Next, at step 126, the RF dead zone data processor processes the position data in accordance with the report request to form an output report. The position data, for example, may be overlaid on a street map of the wireless network or portions thereof. The RF dead zone data processor provides the requested RF dead zone output report to the wireless service provider via an output device (step 128). For example, a display, printer, or another suitable type of rendering device.

At step 130, the wireless service provider evaluates the RF dead zone output report. Typically, the evaluation includes recognizing potential RF dead zones in the output report and considering whether MS users are likely to require wireless service in such areas. For example, if the potential RF dead zone includes a roadway it is more likely that an MS user in that area would require wireless service. Next, at step 132, the wireless service provider determines if an additional RF dead zone output report is desired. If so, the process returns to step 122 to process an additional RF dead zone output report.

Otherwise, if desired, the wireless service provider performs RF engineering to create a wireless network design with improved RF coverage in at least one RF dead zone area of the wireless network (step 134). Next, at step 136, the wireless service provider implements the wireless network design with the improved RF coverage. The improvements to the wireless network design may include modification of an existing BS to alter the area of the cell served by the BS and/or adding an additional cell and corresponding BS to the wireless network. Typically, the improved network design also includes reconfiguring the BSs in adjacent cells so that neighboring cells are properly recognized.

In summary, the invention allows wireless networks to automatically collect RF dead zone data via MSs so that wireless service providers can have metrics (i.e., measurable parameters) to help in the elimination of the RF dead zones through RF engineering or through the addition of new cell sites rather than relying on a combination of customer complaints and drive testing. As long as the MS is powered up, it can collect and transmit position data associated with RF dead zones to the wireless network for storage and subsequent review by the wireless service provider. With position coordinates, the wireless service providers can analyze the position data metrics (e.g., in the form of a geographically displayed RF dead zone map) in order to assist them with RF engineering and future cell site planning.

While the invention is described herein in conjunction with exemplary embodiments, it is evident that many alternatives, modifications, and variations will be apparent to those skilled in the art. Accordingly, the embodiments of the invention in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof.

We claim:

1. A method for collecting data to identify an RF dead zone in a cell of a wireless network using a mobile station, the method including the steps:
   a) at a base station associated with a cell, receiving position data from a powered up mobile station located within the cell, the position data sent by the mobile station when the mobile station determines that a received pilot strength measurement message is less than a predetermined threshold, wherein the position data includes multiple coordinates indicating a location of the mobile station within the cell;
   b) communicating the position data from the base station to a mobile switching center associated with the base station and the wireless network; and
   c) storing the position data in an RF dead zone network associated with the wireless network;
   before step a), further including:
   d) at the powered-up mobile station, receiving information from at least three RF transmitting devices;
   e) at the powered-up mobile station, determining the multiple coordinates forming the position data from the received information; and
   f) at the powered-up mobile station, transmitting the position data to the base station.

2. The method as set forth in claim 1 wherein the receiving step a) is performed whether or not the mobile station is connected to an incoming or outgoing call.

3. The method as set forth in claim 1 wherein the steps a) through c) are periodically repeated while the mobile station is powered up and located within the cell.

4. The method as set forth in claim 1 wherein the multiple coordinates include an X coordinate and a Y coordinate associated with a surface area of the cell.

5. The method as set forth in claim 4 wherein the multiple coordinates include a Z coordinate associated with an altitude within the cell.

6. The method as set forth in claim 1 wherein the RF dead zone network includes an RF dead zone database, wherein the position data is stored in step c) is stored in the RF dead zone database.

7. The method as set forth in claim 1 wherein the RF dead zone network further includes a data network, an RF dead zone data processor, and an output device.

8. The method as set forth in claim 1, before step d), further including:
   g) at the powered-up mobile station, receiving a pilot strength measurement message from the base station; and
   h) determining that the received pilot strength measurement message is less than a predetermined threshold.

9. The method as set forth in claim 1 wherein the RF transmitting devices include the base station and at least two additional base stations associated with the wireless network.

10. The method as set forth in claim 1 wherein the RF transmitting devices include satellites associated with a global positioning system satellite constellation.

11. A method for collecting data to identify an RF dead zone in a wireless network using a mobile station, wherein the wireless network provides wireless service to a geographic area comprised of a plurality of cells, wherein the wireless network includes a plurality of base stations corresponding to the plurality of cells, the method including the steps:
   a) at a base station associated with a first cell of the plurality of cells, receiving position data from a powered up mobile station located within the first cell, the position data being sent by the powered up mobile station when the mobile station determines that a received pilot strength measurement message is less than a predetermined threshold, wherein the position data includes multiple coordinates indicating a location of the mobile station within the wireless network;
   b) communicating the position data from the at least one base station to a mobile switching center associated with the at least one base station and the wireless network; and
   c) storing the position data in an RF dead zone database associated with the wireless network;
   before step a), further including:
   d) at the powered-up mobile station, receiving information from at least three RF transmitting devices;
   e) at the powered-up mobile station, determining the multiple coordinates forming the position data from the received information; and
   f) at the powered-up mobile station, transmitting the position data to the at least one base station.

12. The method as set forth in claim 11 wherein the receiving step is performed whether or not the mobile station is connected to an incoming or outgoing call.

13. The method as set forth in claim 11 wherein steps a) through c) are periodically repeated while the mobile station is powered up and located within the geographic area associated with the wireless network.

14. The method as set forth in claim 11, before step d), further including:
   g) at the powered-up mobile station, receiving a pilot strength measurement message from the base station; and
   h) at the powered-up mobile station, determining that the received pilot strength measurement message is less than a predetermined threshold.

15. The method as set forth in claim 11 wherein the multiple coordinates include an X coordinate and a Y coordinate associated with the geographic area of the wireless network.

16. The method as set forth in claim 15 wherein steps d) includes receiving information from at least four RF transmitting devices and the multiple coordinates include a Z coordinate associated with an altitude associated with the geographic area of the wireless network.

17. A method for collecting data to identify an RF dead zone in a wireless network using a plurality of mobile stations, wherein the wireless network provides wireless service to a geographic area comprised of a plurality of cells, wherein the wireless network includes a plurality of base stations corresponding to the plurality of cells, the method including the steps:
   at each powered-up mobile station:
   a) receiving a pilot strength measurement message from the base station; and b) determining that the received pilot strength measurement message is less than a predetermined threshold;
c) receiving information from at least three RF transmitting devices;
d) determining the multiple coordinates forming the position data from the received information; and
e) transmitting the position data to the at least one base station;

at one or more base stations:

f) receiving position data from each powered-up mobile station whether or not any of the powered-up mobile station is connected to an incoming or outgoing call, the one or more base stations corresponding to one or more cells in which any of the powered-up mobile stations are located, wherein the position data from each powered-up mobile station includes multiple coordinates indicating a location of the powered-up mobile station within the wireless network; and
g) communicating the position data to one or more mobile switching centers associated with the one or more base stations and the wireless network; and at one or more mobile switching centers:

h) storing the position data received from the one or more base stations in an RF dead zone database associated with the wireless network.

18. The method as set forth in claim 17 wherein steps a) through h) are periodically repeated for each powered-up mobile station located within the geographic area associated with the wireless network.

19. The method as set forth in claim 18, further including:
i) receiving a request for an RF dead zone output report from a wireless service provider associated with the wireless network;
j) retrieving position data from the RF dead zone database in response to the report request;
k) processing the retrieved position data according to the report request; and
l) communicating the requested RF dead zone output report to the wireless service provider.

20. The method as set forth in claim 19, the method further including:
m) using the RF dead zone output report to create an improved wireless network design with improved RF coverage in at least one dead zone area of the wireless network; and
n) re-configuring the wireless network according to the improved wireless network design.

21. The method as set forth in claim 17 wherein the multiple coordinates include an X coordinate and a Y coordinate associated with a surface area of the cell.

22. The method as set forth in claim 21 wherein the multiple coordinates include a Z coordinate associated with an altitude within the cell.

* * * * *